June 6, 1944. K. E. WHITELEY 2,350,854
METHOD OF MAKING BUSHINGS FOR SELF-LUBRICATING BEARINGS
Filed Oct. 16, 1941 2 Sheets-Sheet 1
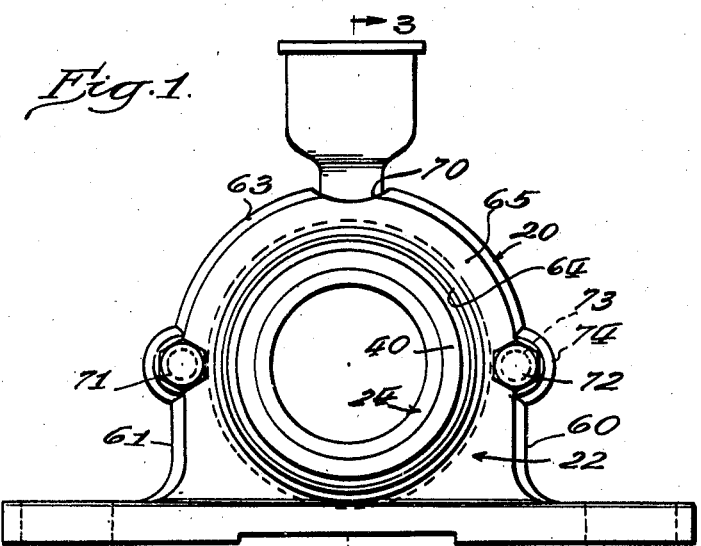
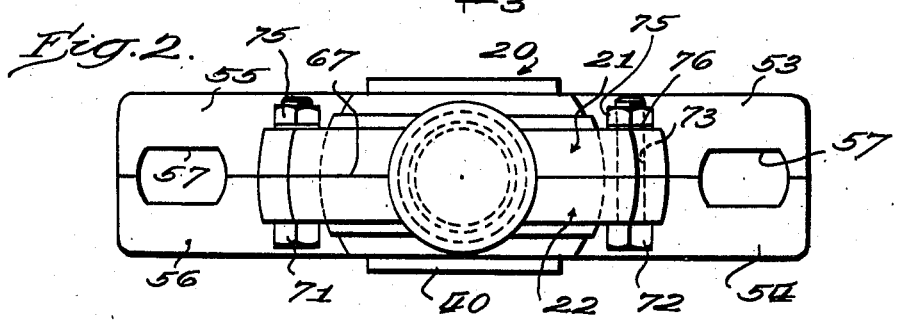
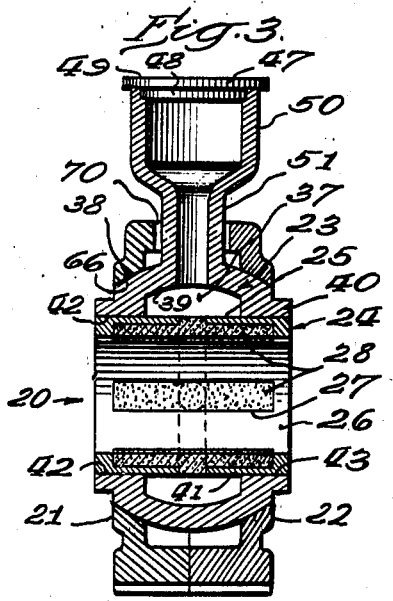
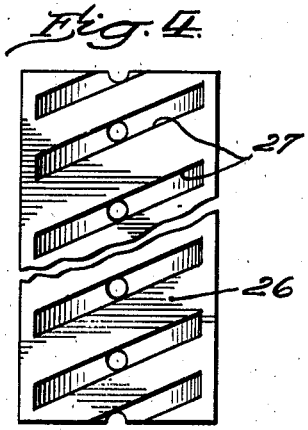
Inventor:
Kenneth E. Whiteley
By McCalet, Wendt & Dickinson
Attys.

June 6, 1944.  K. E. WHITELEY  2,350,854
METHOD OF MAKING BUSHINGS FOR SELF-LUBRICATING BEARINGS
Filed Oct. 16, 1941   2 Sheets-Sheet 2
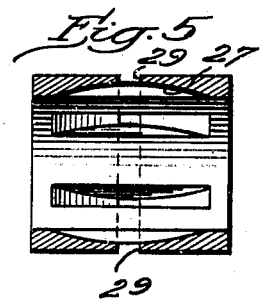
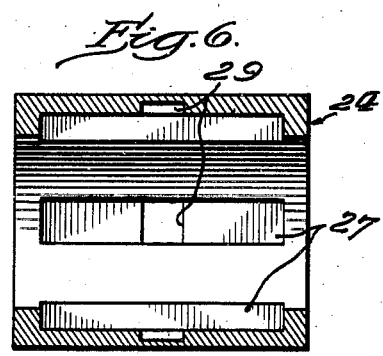
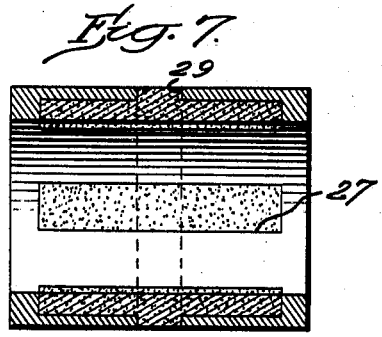
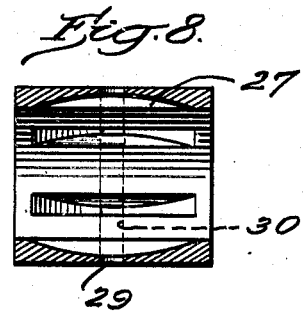
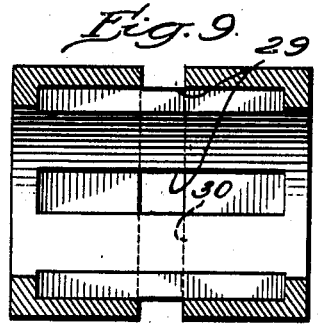
Inventor:
Kenneth E. Whiteley
By
McCabe, Wendt & Dickinson
Attys Patented June 6, 1944

2,350,854

UNITED STATES PATENT OFFICE 2,350,854

METHOD OF MAKING BUSHINGS FOR SELF-LUBRICATING BEARINGS

Kenneth E. Whiteley, Oak Park, Ill., assignor to Randall Graphite Products Corporation, Chicago, Ill., a corporation of Delaware Application October 16, 1941, Serial No. 415,156

1 Claim. (Cl. 29—149.5)

The present invention relates to self-lubricating bearings, and is particularly concerned with self-lubricating bearings of the universal type.

The present application is a continuation in part of my prior application, Serial No. 364,675, filed November 7, 1940.

One of the objects of the invention is the provision of an improved self-lubricating bearing which is adapted to be manufactured at a much lower cost than any of the devices of the prior art, by virtue of the fact that a great many expensive machining operations are eliminated, and the bearing parts are, therefore, adapted to be manufactured at a lower cost.

Another object of the invention is the provision of an improved bearing sleeve structure which is adapted to be provided with grooves and conduits for receiving a lubricant conducting composition with a minimum amount of machine labor.

Another object of the invention is the provision of an improved method of manufacturing self-lubricating bearings of the class described, whereby bearings may be made which are sturdy, capable of long use and adequate lubrication without further attention, and adapted to be manufactured at a low cost.

Other objects and advantages of the invention will be apparent from the following description and the accompanying drawings, in which similar characters of reference indicate similar parts throughout the several views.

Referring to the two sheets of drawings,

Fig. 1 is a side elevational view of a self-lubricating bearing of the "pillow block" or "universal" type embodying my invention;

Fig. 2 is a top plan view of the bearing illustrated in Fig. 1;

Fig. 3 is a vertical sectional view taken on the plane of the line 3—3 of Fig. 1, looking in the direction of the arrows;

Fig. 4 is a developed view of the bearing surface of the bearing sleeve of the one type which may be employed in the bearing;

Fig. 5 is a transverse sectional view taken on the axis of the plane passing through the bearing sleeve showing another type of bearing sleeve which may be used, and which is illustrated in the condition which it assumes during one of the steps of its manufacture;

Fig. 6 is a similar view of another type of bearing sleeve which is shown just after it has been cast or molded, but before it has been completed;

Fig. 7 is another illustration of a bearing sleeve of the type of Fig. 6, in its finished condition;

Fig. 8 is a view similar to Fig. 5, of another type of bearing sleeve illustrating another of the steps of the process of making such bearing sleeves;

Fig. 9 is another view of a partially completed bearing sleeve illustrating one of the steps in its method of manufacture.

Referring to Figs. 1, 2, and 3, 20 indicates in its entirety a self-aligning, self-lubricating bearing embodying the invention. This bearing preferably includes a supporting frame or housing made up of two similar but oppositely located members 21, 22, a reservoir member 23, and a bushing or bearing sleeve 24.

The bearing sleeve 24 may be of the type shown in Figs. 3 or 4, or any of the other Figures 5 to 9.

In the embodiment illustrated, it consists of the cylindrical bearing member 24 of bearing metal, such as brass or bronze, or other suitable material, having an outer cylindrical surface 25, and an inner cylindrical bearing surface 26.

The bearing surface 26 is preferably provided with a plurality of regularly spaced grooves 27, which are adapted to receive a filling 28 of initially plastic carbon compound which has been heated or baked to render it porous, and the compound preferably includes graphite, and is adapted to conduct lubricant from the interior chamber of the reservoir 23 to the bearing surface 26.

These grooves 27 and carbon lubricating members 28 preferably extend longitudinally of the bearing sleeves, and they may be inclined as shown in Fig. 4, in order to provide a wiping action by means of which the lubricant from the carbon conducting members 28 will be spread uniformly over the intervening bearing surface 26, whether the direction of movement be rotation inside the bearing or reciprocation.

Any of the bushings shown in Figs. 3 to 8 may be used in the bearing.

The grooves 27 in the bushing 24 are preferably tapered in depth, decreasing toward each end of the groove, so that the base of the groove, as shown in cross-section in Fig. 5 may approximate the curve of a circle of larger diameter than the bushing.

Fig. 5 shows the bushing as it appears when it has been made out of cast metal and has been cast with a wall of greater thickness than is desired in the finished bushing. This bushing may be cast by means of a sand core so that it is unnecessary to perform any machining operations in the formation of the grooves. The casting may then be subjected to a machining operation for rendering the bearing surface 26 smoothly cylindrical, and the exterior cylindrical surface 26 may also be machined to a smooth cylindrical surface.

Sufficient of the exterior of this bushing may be removed so that, due to the depth of the grooves 27 near the middle of the bushing, a plurality of apertures 29 will be opened at various points around the periphery of the bushing.

Due to the fact that apertures 29 will appear only at the places where the grooves 27 are located, sufficient body is left in the bushing at the points between the grooves to provide a support for a shaft. Thus the apertures 29 may be formed without any drilling operations, and the cost of the bushing is materially reduced.

Fig. 6 shows a bearing bushing of the type used in Fig. 3, immediately after casting the bushing; and it will be noted that the grooves 27 are present, and there are a plurality of cylindrical bores or sockets 29 which communicate with the grooves, but which are closed at their outer end. These bores 29 may be opened by cutting off sufficient of the outer surface of the bushing 24 so that apertures 29 are formed, as shown in Fig. 7.

Another mode of opening the apertures is to form an annular groove 30 around the outer cylindrical surface of the bearing bushing in registry with the sockets or apertures 29.

This groove will open the ends of the apertures with a minimum amount of machining, but will not cut the bearing in two parts, due to the material which is located between the grooves 27.

In the embodiment of Fig. 5, the grooves 27 are of curved shape and communicate with sockets 29, which become apertures as soon as the outer part of the bushing has been trimmed down suitably. In this embodiment it is also possible to provide openings at the apertures 29 by means of a peripheral groove 30, as shown in Fig. 8.

In all of these cases the apertures and the grooves with which they communicate are preferably filled with an initially plastic porous graphite compound. The plastic compound contains carbon and a binder, and a part of the carbon is removed during the baking operation so that the compound, which is initially plastic, becomes porous. It is adapted to contain conducting lubricant from the reservoir 23 to the bearing surface 26.

Referring again to Fig. 3, the reservoir member 23 is here shown in section with the bushing 24 and frame members 21, 22. The reservoir member 23 may comprise a cast metal member which may be formed by die casting, utilizing a sand core for forming the reservoir chamber 37. This reservoir member has an exterior partially spherical surface 38, and may be provided with an annular groove 39, which forms the reservoir chamber 37 when the reservoir member 23 is assembled with the bushing 24.

The reservoir member 23 may be provided with a longitudinally extending annular flange 40 at each end, or its inwardly projecting end portions 41 may be provided with the inner cylindrical surfaces 42, 43, having a tight frictional fit with the external surfaces 25 of the finished bushings 24.

The reservoir member 23 is preferably formed by die casting, which provides its partially spherical surface 38 with a sufficiently smooth exterior finish so that it is unnecessary to do any machining.

In other embodiments of the invention the reservoir member and all of the other parts of the bearing, except the bolts, may be made of a phenolic condensation compound, such as "Bakelite," in which case the surfaces would all be made sufficiently smooth so that, of course, no machining is necessary.

In the embodiment of Fig. 3, the cylindrical oil cup body 50 and its discharge conduit 51 may be formed integrally with the reservoir member indicated by the numeral 23, and with this embodiment it is unnecessary to purchase oil cups on the market or to assemble them with the reservoir member, thus materially reducing the cost by the inclusion of this feature in the reservoir member itself.

The oil cup may be provided with a cover member 47, having a reduced cylindrical portion 48, which has a frictional fit in a counterbore 49, or the cover 47 may be hinged on the oil cup 50, or it may be threaded into the counterbore 49.

The frame members 21, 22 have already been described as being similar in construction, but oppositely located. Each one of these frame members is provided at each end of the bottom with a laterally projecting attaching flange 53, 54, 55, and 56.

The attaching flanges 53—56 are all in the same plane, and each of these attaching flanges is provided with a laterally inwardly projecting groove or slot 57, so that when the frame members are assembled as shown, an aperture is provided in the frame at each end, that is, at the right and the left of Fig. 2 for receiving bolts by means of which the complete bearing is secured to a support.

Each of the frame members 21 and 22 has an upwardly extending body bounded by the plane side surfaces 60, 61 and the cylindrical surface 63. This body has a circular aperture 64 in its outer face 65, the aperture communicating with a partially spherical surface 66 (see Fig. 3). The partially spherical surface 66 is so shaped that it is complementary to the exterior spherical surface 38 on the reservoir member.

The inner face 67 of each of the frame members 21, 22 is substantially flat and plane so that these two frame members may fit together, as shown in Fig. 2, to form a complete housing. The spherical surface 66 in each frame member is so inclined and has its center so located that it is generated by a circular line rotating on an axis which is at right angles to the axis of the bushing 24 (Fig. 3).

Thus the diameter of the aperture in the frame member 21 at the point 67 is larger than the diameter at the aperture 64, and the two frame members are adapted to fit together in such manner that the surfaces 66 form parts of the same spherical surface for engaging the ball of the reservoir 23.

The body 65 of each of the housing or frame members 21, 22 is preferably provided with a slot 70 at the top (Fig. 8) for passing the discharge pipe 51 of the oil cup 50 and permitting a limited universal movement between the reservoir 23 and the supporting frame members 21, 22.

These frame members 21, 22 are preferably secured together by a pair of bolts or other threaded members 71, 72 which may be located in the registering through bores 73, which are formed in the walls of the body 65 at a point 74 where the body is made thicker to provide stock for surrounding the apertures 73.

The nuts 75 on the bolts 71, 72 securely clamp the two half housing members 21, 22 together on the reservoir 23. Spring washers 76 on each bolt may be used under the nut and/or head for the purpose of giving the bolts a resilient clamping action which tends to hold the ball of the reservoir member 23 in its position by friction.

The half housing members 21, 22 may also be formed by die casting. In this case no sand cores are required, and the spherical surfaces 66, which are formed by die casting these parts, are substantially smooth and finished so that no machining of these spherical surfaces is necessary.

This reduces the cost of the universal self-lubricating bearing very materially, and enables it to be manufactured at such a low cost that it may be more widely used and placed within the reach of a larger number of consumers.

The bushings may also be made without the necessity for cutting grooves in the bushing, since the grooves are cast into the bushing and the apertures between the grooves and the reservoir are provided by the act of making the wall thinner when the bushing is trimmed down and finished on its exterior cylindrical surface.

The present bushings may also be manufactured at a much lower cost than the devices of the prior art, and may be provided with lubricant apertures, without necessity for any drilling.

Thus the cost of the complete self-lubricating universal bearings is substantially reduced, so that it is possible to sell them at such a low price that they can be used in a great many places where the devices of the prior art would be too expensive.

As the grooves of my bushings are formed by casting, they have a roughened surface which is better adapted to retain the porous carbon compound in them, and there is a better adhesion between the porous carbon compound filling of the grooves and the wall of the grooves.

While I have illustrated a preferred embodiment of my invention, many modifications may be made without departing from the spirit of the invention, and I do not wish to be limited to the precise details of construction set forth, but desire to avail myself of all changes within the scope of the appended claim.

Having thus described my invention, what I claim as new and desire to secure by Letters Patent of the United States, is:

The method of making self-lubricating bearing bushings which comprises casting a substantially cylindrical bushing having a cylindrical bearing surface and an exterior substantially cylindrical surface, said bearing surface being formed with a plurality of grooves of varying depth, said grooves all having a deeper part located between the ends of said bushing, cutting an external groove in the exterior of said bushing and in alignment with the deeper portions of said grooves until apertures are formed at said deeper portions, filling said apertures and the grooves on said bearing surface with an initially plastic carbon lubricating compound and baking said compound to produce a porous lubricant conducting member to conduct lubricant from a reservoir.

KENNETH E. WHITELEY.